United States Patent
Mittal et al.

(10) Patent No.: US 10,824,558 B2
(45) Date of Patent: Nov. 3, 2020

(54) OPTIMIZED SORTING OF VARIABLE-LENGTH RECORDS

(71) Applicant: Oracle International Corporation, Redwood Shores, CA (US)

(72) Inventors: Ashish Mittal, Foster City, CA (US); Steve Simon Joseph Fernandez, Columbia, MO (US); Kenneth Khiaw Hong Eng, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 312 days.

(21) Appl. No.: 15/960,385

(22) Filed: Apr. 23, 2018

(65) Prior Publication Data
US 2018/0314465 A1   Nov. 1, 2018

Related U.S. Application Data

(60) Provisional application No. 62/490,471, filed on Apr. 26, 2017.

(51) Int. Cl.
| | |
|---|---|
| *G06F 16/00* | (2019.01) |
| *G06F 12/04* | (2006.01) |
| *G06F 3/06* | (2006.01) |
| *G06F 7/36* | (2006.01) |
| *G06F 16/28* | (2019.01) |

(52) U.S. Cl.
CPC ............ *G06F 12/04* (2013.01); *G06F 3/0608* (2013.01); *G06F 7/36* (2013.01); *G06F 16/282* (2019.01); *G06F 16/284* (2019.01)

(58) Field of Classification Search
None
See application file for complete search history.

(56) References Cited

U.S. PATENT DOCUMENTS

| | | |
|---|---|---|
| 4,611,280 A | 9/1986 | Linderman |
| 5,487,166 A | 1/1996 | Cossock |
| 5,640,554 A | 6/1997 | Take |

(Continued)

OTHER PUBLICATIONS

U.S. Appl. No. 15/951,002, Notice of Allowance dated Mar. 5, 2020, 9 pages.

(Continued)

*Primary Examiner* — Son T Hoang
(74) *Attorney, Agent, or Firm* — Kilpatrick Townsend & Stockton LLP

(57) ABSTRACT

Optimized techniques are disclosed for sorting variable-length records using an optimized amount of memory while maintaining good locality of references. The amount of memory required for sorting the variable length records is optimized by reusing some of the memory used for storing the variable length records being sorted. Pairs of input runs storing variable length records may be merged into a merged run that contains the records in a sorted order by incrementally scanning, sorting, and copying the records from the two input runs being merged into memory pages of the merged run. When all the records of a memory page of an input run have been processed or copied to the merged run, that memory page can be emptied and released to a cache of empty memory pages. Memory pages available from the cache of empty memory pages can then be used for generating the merged run.

20 Claims, 14 Drawing Sheets

(56) References Cited

U.S. PATENT DOCUMENTS

| | | |
|---|---|---|
| 5,799,210 A | 8/1998 | Cohen |
| 5,850,547 A | 12/1998 | Waddington et al. |
| 5,852,826 A | 12/1998 | Graunke et al. |
| 5,951,658 A | 9/1999 | Daray, Jr. |
| 6,105,024 A | 8/2000 | Graefe et al. |
| 7,409,517 B2 | 8/2008 | Dageville et al. |
| 7,496,572 B2 | 2/2009 | Blaicher |
| 7,590,620 B1 | 9/2009 | Pike et al. |
| 7,725,900 B2 | 5/2010 | Sauermann |
| 8,478,755 B2 | 7/2013 | Lyon |
| 9,129,004 B2 | 9/2015 | Yaroslavskiy et al. |
| 9,274,950 B2 | 3/2016 | Graefe |
| 2003/0065688 A1 | 4/2003 | Dageville |
| 2004/0073763 A1 | 4/2004 | Dageville |
| 2006/0064535 A1 | 3/2006 | Walker |
| 2006/0236046 A1 | 10/2006 | Bowers |
| 2010/0174690 A1* | 7/2010 | Marcotte ............... G06F 16/178 707/695 |
| 2011/0055232 A1* | 3/2011 | Graefe .................. G06F 12/08 707/752 |
| 2012/0254173 A1 | 10/2012 | Graefe |
| 2013/0185337 A1 | 7/2013 | Lipcon |
| 2014/0006878 A1 | 1/2014 | Kalluri |
| 2017/0228319 A1 | 8/2017 | Mueller et al. |
| 2017/0235614 A1 | 8/2017 | Choe et al. |
| 2017/0249359 A1 | 8/2017 | Abdelwahab |
| 2018/0150472 A1 | 5/2018 | Chen et al. |

OTHER PUBLICATIONS

Auger, et al., "Merge Strategies: from Merge Sort to TimSort", HAL archivepouvertes.fr, Dec. 9, 2015, hal-01212839v2, 15 pages.

Rhone; Stefanie, "Oracle Fusion Middleware, User's Guide for Oracle Data Visualization Desktop", Oracle, E70158-02, Oct. 2016, 96 pages.

Sinha et al., Cache-Efficient String Sorting Using Copying, School of Computer Science and Information Technology; RMIT University, Melbourne, Australia, 2006, 29 pages.

Sorting Variable-Length Records—CA VM:Sort™—1.4—CA Technologies Documentation, documentation powered by DocOps, https://docops.ca.com/ca-vm-sort/1-4/en/using/sorting-and-merging-files/sorting-variable-length-records, retrieved on Jul. 25, 2017, 1 page.

Sorting Variable Length Records, IBM i7.2, Sorting and Merging Files, https://www.ibm.com/support/knowledgecenter/en/ssw_ibm_i_72/rzase/cblsortvarlen.htm, retrieved on Jul. 26, 2017, 1 page.

U.S. Appl. No. 15/945,637, Notice of Allowance dated May 15, 2020, 7 pages.

* cited by examiner

OPTIMIZED SORTING OF VARIABLE-LENGTH RECORDS

CROSS-REFERENCES TO RELATED APPLICATIONS

The present application is a non-provisional of and claims the benefit and priority of U.S. Provisional Application No. 62/490,471 filed Apr. 26, 2017, entitled OPTIMIZED SORTING OF VARIABLE-LENGTH RECORDS, the entire contents of which are incorporated herein by reference for all purposes.

BACKGROUND

Sort algorithms (e.g., Timsort) are frequently implemented with fixed-length data records in mind, in which the data records being sorted are all of a fixed length. Under a fixed-length format, each data record takes up the same amount of space in memory irrespective of the length of the data stored by the record (even if the length of the content stored by data record is shorter than the fixed-length of the record). The use of fixed length records is thus not very efficient with a heavy memory footprint, especially when the content of the records can have variable lengths.

In order to reduce the memory footprint associated with fixed length records, data records can instead be stored in a variable-length format to represent variable length fields in a more compact manner. Under a variable-length format, each data record only takes up space in memory corresponding to the actual length of the content of the data record.

Although variable-length record representations save memory in comparison to fixed-length records, they are not widely used because the use of variable-length records poses additional complexity and challenges for various operation such as for sort operations. Since the size of the sorted element (the record) is variable, the common sorting approach of swapping elements is cumbersome to implement. Furthermore, processing variable-length records can require varying amounts of temporary memory. These variations in temporary memory requirements can be a source of inefficiency for the data processing system processing those records, since the system may have to allocate/deallocate additional temporary memory as more is needed/unneeded.

One conventional workaround used to sort variable-length records is to use pointers to the records. However, the pointers themselves need additional memory, which can be wasteful of memory. Additionally, this approach however has poor locality of reference, as there is random access of memory locations when comparing records. For purposes of sorting efficiency, it is preferred from the perspective of the CPU that set of data records being sorted are stored close together in memory (e.g., preferably in a contiguous allocation of memory) thus allowing the CPU to quickly access the data records. However, when pointers are used for the sorting, the underlying data records referenced by the pointers may be stored anywhere in memory and may not be close together resulting in the CPU having to jump around to different addresses in the memory to access and sort the records. This makes the sort operation inefficient and also prevents the use of certain performance optimization techniques requiring strong locality of reference, such as caching and prefetching memory operations.

BRIEF SUMMARY

The present disclosure relates to techniques for sorting records, and more particularly to optimized techniques for sorting variable-length records in an efficient manner. In certain embodiments, variable length records are sorted using a sort algorithm that uses an optimized amount of memory for sorting the records while maintaining good locality of references. Various inventive embodiments are described herein, including methods, systems, non-transitory computer-readable storage media storing programs, code, or instructions executable by one or more processors, and the like.

In certain embodiments, the amount of memory required for sorting the variable length records is optimized by reusing some of the memory used for storing the variable length records being sorted. For example, the variable length records being sorted may be stored in runs of memory, with each run comprising a subset of the records being sorted. Each run may comprise a set of memory pages storing the variable length records in that run. Each memory page may be of a constant, fixed size of temporary memory. The records in a run may be sorted. The sorted runs may then, in a pairwise manner be merged into a single merged sorted run by incrementally scanning, sorting, and copying the records from the two input runs being merged into memory pages of the merged run. Whenever all the records in the input memory runs have been processed, the merged run contains the records from the two input runs in a sorted order. In certain embodiments, memory pages storing the variable length records for the input runs may be reused for the merged run. During the generation of the merged run, when all the records of a memory page of an input run have been processed or copied to the merged run, that memory page can be emptied and released to a cache of empty memory pages. Empty memory pages available from the cache of empty memory pages can be used for the merged run, thereby reusing those pages and without having to allocate more memory for the merged run. For example, when a merged run needs a new memory page for storing the variable length records, one or more memory pages from the cache of memory pages can be used for the merged run. In this manner, the memory pages used for storing the variable length records in the input runs are reused for generating the merged run. As a result, the amount of temporary memory required for generating a sorted merged run is at most two extra memory pages in the worst cases, regardless of the input run sizes.

By reusing memory pages during a merge, the overall additional memory required to generate a sorted merged run is dramatically reduced. The amount of temporary memory required for generating a sorted merged run is at most two extra memory pages in the worst cases, regardless of the input run sizes. This also reduces the typical significant variations in the amount of temporary memory required for a variable length records sort, while also enabling the records from two input runs to be merged. Further, since the sort algorithm described herein repeatedly copies data records from the input runs into new memory locations during the merge-sort process, this approach avoids both the swapping of data records held at separate memory locations and the use of pointers. Further, input runs records can be merged based on their relative sizes rather than their memory locations, which improves processing speed due to the increased efficiency associated with merge-sorting runs of similar sizes.

In some embodiments, computer-implemented techniques (e.g., methods, systems, non-transitory computer-readable storage media storing programs, code, or instructions executable by one or more processors) are disclosed for sorting variable length records, the techniques comprising that includes accessing, from a memory, a first run including a first set of sorted variable length records, where the first run may include one or more memory pages storing the first set of sorted variable length records. A second run may be accessed, from the memory, the second run including a second set of sorted variable length records. The second run may include one or more memory pages storing the second set of sorted variable length records. A merged run may be generated in memory by copying records from the first run and the second run to the merged run. The merged run may include records from the first set of variable length records and records from the second set of variable length records in a sorted order. Generating the merged run may include determining that all records stored by a first memory page in the first run have been copied to the merged run, responsive to the determining, releasing the first memory page from the first run to a cache of memory pages, and using the first memory page for storing one or more records copied to the merged run from the first or second run.

In some embodiments, using the first memory may include determining that the merged run needs additional memory for storing a particular record being copied from the first or second run, determining whether the cache of memory pages comprises any memory page, upon determining that the cache of memory pages comprises the first memory page, using the first memory page for the merged run, and copying the particular record from the first or second run to the first memory page.

In some embodiments, generating the merged run may include determining that all records on a second memory page in the second run have been copied to the merged run, releasing the second memory page from the second run to the cache of memory pages, and using the second memory page for storing one or more records copied to the merged run from the first or second run.

In some other embodiments, generating the merged run may include reading a first record stored on the first memory page in the first run, reading a second records from the second run, comparing the first record to the second record, and based upon the comparing, copying the first record from the first run to the merged run. In such an embodiment, determining that all records on a first memory page in the first run have been copied to the merged run may be performed after copying the first record from the first run to the merged run.

In some embodiments, a plurality of runs may be in the memory, the plurality of runs including the first run and the second run. From among the plurality of runs, the first run and the second run may be identified as those runs in the plurality of runs that have the closest number of records to each other. Further, responsive to determining that the first run and the second run have the closest number of records to each other, the first run and the second run may be selected to be merged. In some embodiments, the first run may be stored in a first section of the memory and the second run may be stored in a second section of the memory, with the first section in the memory is not contiguous with the second section in the memory.

In some embodiments, the first set of variable length records may include a first record of a first size and a second record of a second size, and the first size may be different from the second size. In some embodiments, the first run includes a second memory page and a number of variable length records stored by the first memory page in the first run is different from a number of records stored by the second memory page in the first run.

The foregoing, together with other features and embodiments will become more apparent upon referring to the following specification, claims, and accompanying drawings.

DETAILED DESCRIPTION

Figure 1:
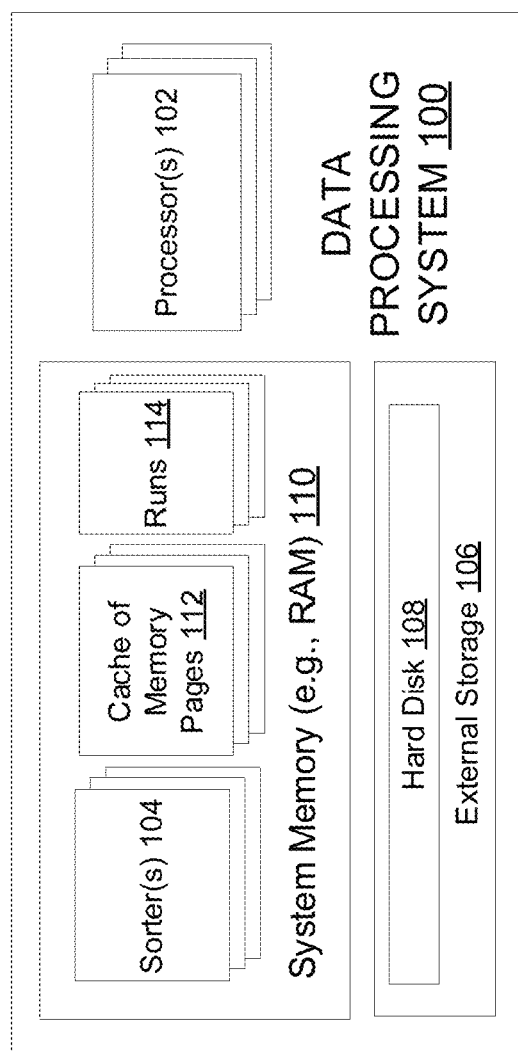
FIG. 1 is a simplified block diagram of a data processing system capable of performing optimized sorting of variable-length records according to certain embodiments.

In the following description, for the purposes of explanation, specific details are set forth in order to provide a thorough understanding of the embodiments described in this application. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

The present disclosure is directed towards processing data records using a sort operation, which is any process of arranging data records systematically in sequence or sets, in an order based on some criterion.

Data records are often stored in fixed-length format, i.e., all the records being sorted have the same size. In a fixed-length format, all fields of a record (and hence the records themselves) have the same length regardless of its data content. If the actual string data content stored by a field is less than the size of the field, the content is padded with useless bytes leading to wastage or inefficient use of memory. This can translate to large memory wastage for storing a large number of records in fixed-length format. For example, consider a record with the following structure:

```
Record {
    integer ID;        (4 bytes, assuming 4 bytes for storing an integer)
    char(20) STATE;    (40 bytes long, assuming 2 bytes for each character)
    char(30) CITY;     (60 bytes long, assuming 2 bytes for each character)
}
```

This structure may define records stored in a table. The total number of bytes needed for storing each record is thus (4+40+60=104 bytes) irrespective of the content of the various fields of the record. For example, for a record storing (ID=1; STATE=California; CITY=San Francisco) or a record storing (ID=2; STATE=Washington; CITY=Seattle), the length of the records is the same irrespective of the contents of the records. In this example, in the record whose STATE field is "California", which actually requires only 20 bytes for storage, the STATE field is padded with 20 bytes before the beginning of the CITY field. This is wastage of memory and can translate to large memory wastage for storing a large number of records in fixed-length format.

Alternatively, the data records can be stored in variable-length format in order to reduce the memory footprint. For example, VARCHAR(n) is a data type used in SQL engines for representing strings, where n represents the maximum number of characters in a given field. For example, a variable length records may be defined as follows:

```
Record {
    integer ID;
    varchar(20) STATE;  (20 = maximum number of characters in field)
    varchar(30) CITY;   (30 = maximum number of characters in field)
}
```

A variable length record may start off with the record's total length in bytes. Each variable length field also begins with the field's actual data size. So records for storing (ID=1; STATE=California; CITY=San Francisco) and (ID=2; STATE=Washington; CITY=Seattle) may be stored as follows:

| 62 | 1 | 20 | California | 26 | San Francisco |
|---|---|---|---|---|---|
| 4 bytes | 4 bytes | 4 bytes | 20 bytes | 4 bytes | 26 bytes |

Total: 62 bytes

| 62 | 2 | 20 | Washington | 26 | Seattle |
|---|---|---|---|---|---|
| 4 bytes | 4 bytes | 4 bytes | 20 bytes | 4 bytes | 14 bytes |

Total: 50 bytes

As can be seen from the above example, 62 bytes are used for storing the first record in variable length format (as opposed to 104 bytes in the fixed-length format) and 50 bytes are used for storing the second record in variable length format (as opposed to 104 bytes in the fixed-length format). It can be seen that the size of these variable-length records is smaller than the comparable fixed-length records.

While the variable-length format saves memory in comparison to fixed-length records, as described above, they are not widely used because the use of variable-length records poses additional complexity and challenges for various operations such as sort operations. Further, variable length records held at separate locations cannot be simply swapped while sorting because of the differing lengths of the records. In the above example, the difficulty in swapping the memory locations for the two records of "San Francisco" and "Seattle" is apparent, since "San Francisco" would not be able to fit in the 14 bytes of memory in which "Seattle" is stored in. Furthermore, for sort algorithms tailored for fixed-length records (e.g., Timsort), which use temporary memory to merge-sort runs based on the size of the lesser of the two runs being merged, the processing of variable-length records can require varying amounts of temporary memory. Depending on the size of the runs, the amount of temporary memory required to merge runs of variable-length records can vary significantly. These variations in temporary memory requirements can be a source of inefficiency due to added steps for allocating or deallocating additional temporary memory as more is needed/unneeded depending on the runs being merged.

The present disclosure relates to techniques for sorting records, and more particularly to optimized techniques for sorting variable-length records in an efficient manner. In certain embodiments, variable length records are sorted using a sort algorithm that uses an optimized amount of memory for sorting the records while maintaining good locality of references.

In certain embodiments, the amount of memory required for sorting the variable length records is optimized by reusing some of the memory used for storing the variable length records being sorted. For example, the variable length records being sorted may be stored in runs of memory, with each run comprising a subset of the records being sorted. Each run may comprise a set of memory pages storing the variable length records in that run. Each memory page may be of a constant, fixed size of temporary memory. The records in a run may be sorted. The sorted runs may then, in a pairwise manner be merged into a single merged sorted run by incrementally scanning, sorting, and copying the records from the two input runs being merged into memory pages of the merged run. Whenever all the records in the input memory runs have been processed, the merged run contains the records from the two input runs in a sorted order. In certain embodiments, memory pages storing the variable length records for the input runs may be reused for the merged run. During the generation of the merged run, when all the records of a memory page of an input run have been processed or copied to the merged run, that memory page can be emptied and released to a cache of empty memory pages. Empty memory pages available from the cache of empty memory pages can be used for the merged run, thereby reusing those pages and without having to allocate more memory for the merged run. For example, when a merged run needs a new memory page for storing the variable length records, one or more memory pages from the cache of memory pages can be used for the merged run. In this manner, the memory pages used for storing the variable length records in the input runs are reused for generating the merged run. As a result, the amount of temporary memory required for generating a sorted merged run is at most two extra memory pages in the worst cases, regardless of the input run sizes.

By reusing memory pages during a merge, the overall additional memory required to generate a sorted merged run is dramatically reduced. The amount of temporary memory required for generating a sorted merged run is at most two extra memory pages in the worst cases, regardless of the input run sizes. This also reduces the typical significant variations in the amount of temporary memory required for a variable length records sort, while also enabling the records from two input runs to be merged. Further, since the sort algorithm described herein repeatedly copies data records from the input runs into new memory locations during the merge-sort process, this approach avoids both the swapping of data records held at separate memory locations and the use of pointers. Further, input runs records can be merged based on their relative sizes rather than their memory locations, which improves processing speed due to the increased efficiency associated with merge-sorting runs of similar sizes.

FIG. 1 is a simplified block diagram of a data processing system 100 capable of performing optimized sorting of variable-length records according to certain embodiments. Data processing system 100 depicted in FIG. 1 is merely an example and is not intended to unduly limit the scope of claimed embodiments. One of ordinary skill in the art would recognize many possible variations, alternatives, and modifications. For example, in some implementations, data processing system 100 may have more or fewer systems or components than those shown in FIG. 1, may combine two or more systems, or may have a different configuration or arrangement of systems. In some embodiments, the data processing system 100 may be a server or cloud computing cluster, such as a backend server designed to process queries of a database. Data processing system 100 may include one or more computer systems or devices.

As depicted in FIG. 1, data processing system 100 may include hardware elements such as processor(s) 102, external storage 106, and/or system memory 110 (e.g., RAM). System memory 110 may provide memory resources for processors 102. System memory 110 is typically a form of volatile random access memory (RAM) (e.g., dynamic random access memory (DRAM), Synchronous DRAM (SDRAM), Double Data Rate SDRAM (DDR SDRAM)). In some embodiments, the data processing system 100 may include external storage 106, which may include non-volatile memory to store data that is to be persisted. The external storage 106 may come in different forms such as a hard disk 108, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like.

Information related to an operating system and applications or processes executed by processors 102 may be loaded in system memory 110. For example, one or more applications and processes executed by data processing system 100 may be loaded into system memory 110. For example, as depicted in FIG. 1, multiple sorter processes 104 may be loaded in system memory 110 and executed concurrently by processor(s) 102 of data processing system 100.

The processor(s) 102 may be configured to execute or run instructions (e.g., code, code objects) for implementing the functions performed by data processing system 100. These functions may include database-related tasks, sorting functions, and the like. Processors 102 may include single core processors or multicore processors. Processors 102 may execute one or more virtual machines.

As depicted in FIG. 1, sorters(s) 104 may represent one or more processes executed by data processing system 100 for performing optimized sorting of variable-length records. Each of the sorters 104 may have input/output (I/O) access capabilities with the system memory 110 and/or external storage 106. Multiple sorters may be executed concurrently. Each sorter 104 may receive a set of runs to be sorted and merged together, with each run including a sorted sequence of variable-length data records stored across one or more memory pages. Since sorters 104 may execute in parallel, each sorter may be tasked with sorting and merging a different set of runs 114 (e.g., a pair of runs) by performing optimized sorting of the variable-length records in those runs 114. In this manner, multiple sorting operations may be performed in parallel by the multiple sorters 104.

Each of the runs 114 may consist of a pre-sorted subset of variable-length stored in a list of memory pages. During the merge-sort process, a sorter 104 may incrementally sort and merge the data records held in two input runs into a merged run, which may involve the recycling of memory pages from the cache of memory pages 112. When the records stored in a memory page of an input run have all been copied over to the merged run, the sorter 104 may release that memory page to the cache of memory pages 112. Additionally, when additional memory pages are needed in the merged run to store data records being copied over from the input runs, the sorter 104 may obtain an empty memory page from the cache of memory pages 112 to add to the merged run.

Figure 2:
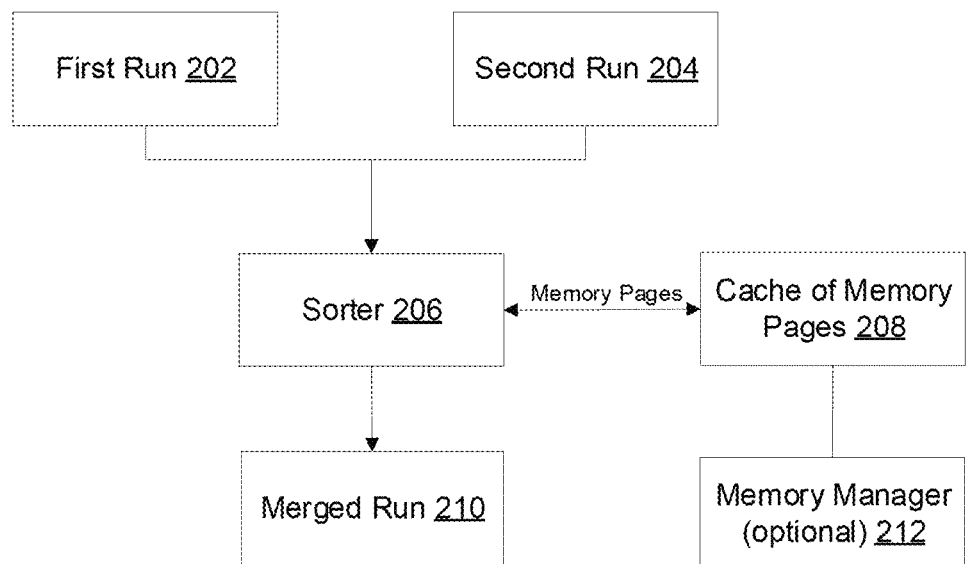
FIG. 2 is a simplified block diagram of the components of a data processing system involves in performing optimized sorting of variable-length records according to certain embodiments.

FIG. 2 is a simplified block diagram of the components of a data processing system involves in performing optimized sorting of variable-length records according to certain embodiments. The components of the data processing system depicted in FIG. 2 are merely an example and is not intended to unduly limit the scope of claimed embodiments. One of ordinary skill in the art would recognize many possible variations, alternatives, and modifications. For example, in some implementations, there may be a memory manager 212, while in other embodiments, there may not be a memory manager 212.

In some embodiments, a sorter 206 may be tasked with sorting and merging the contents of a first run 202 and a second run 204. The first run 202 may be a set of variable-length records in sorted order and stored across a list of one or more memory pages. The second run 204 may also be a set of variable-length records in sorted order and stored across a list of one or more memory pages. Thus, the sorter 206 may be tasked with combining the set of variable-length records in the first run 202 with the set of variable-length records in the second run 204 into a merged run 210 that will have all of those variable-length records arranged in sorted order.

In order to do this, the sorter 206 may have access to a cache of memory pages 208 that are empty (e.g., temporary sections of memory that are of a constant size). It should be noted that the term "cache" of memory pages may simply refer to a list that is maintained of empty memory pages. In some embodiments, the sorter 206 may update this list when empty memory pages are released or when an empty memory page is retrieved (e.g., to be included in the merged run 210). In some embodiments, a memory manager 212 may instead maintain the list of empty memory pages and update the list once empty memory pages are released by the sorter 206 or when empty memory pages are provided to the sorter 206 (e.g., to be included in the merged run 210).

Figure 3:
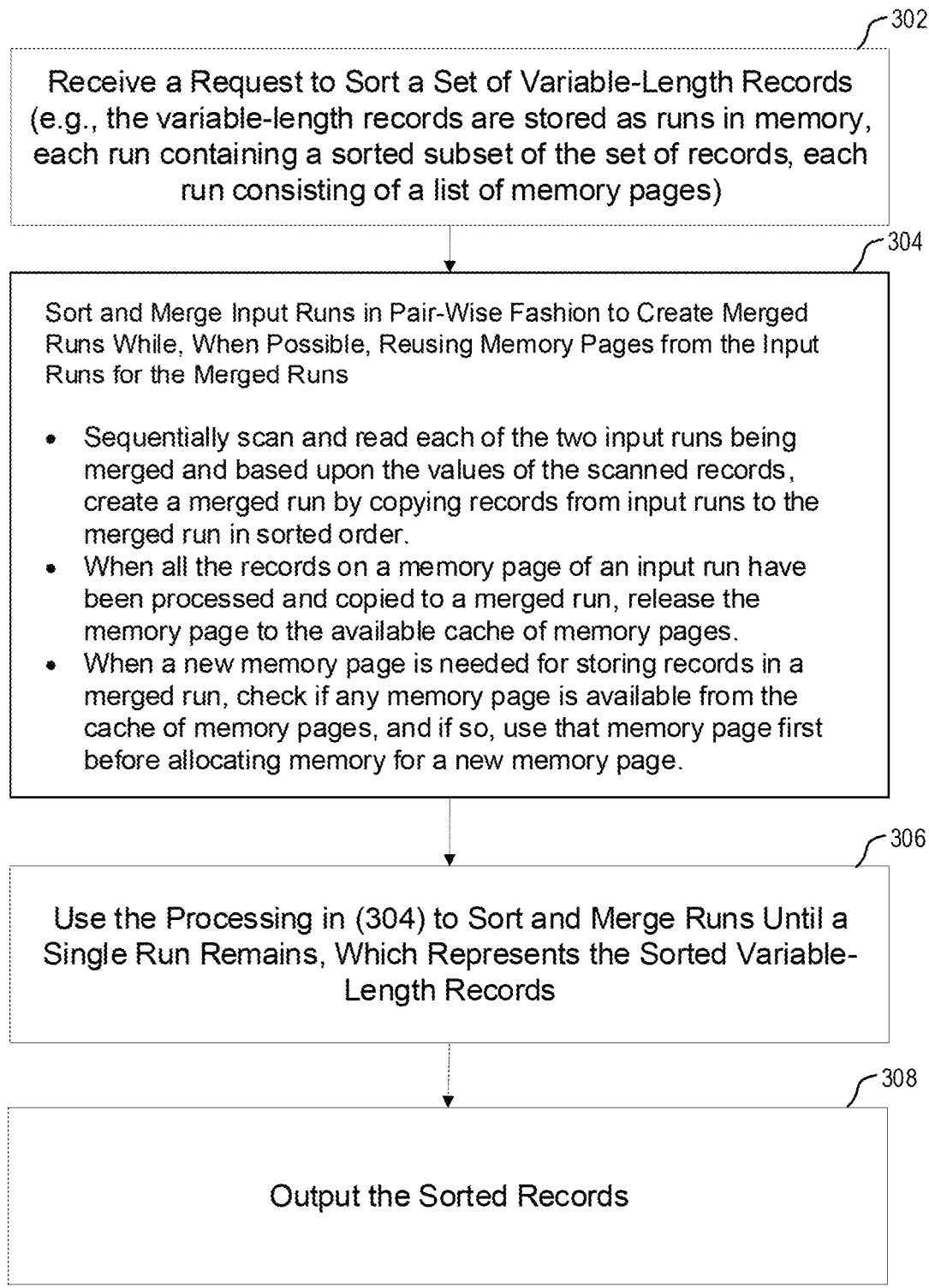
FIG. 3 is a flowchart illustrating a method of performing optimized sorting of variable-length records according to certain embodiments.

FIG. 3 is a flowchart illustrating a method of performing optimized sorting of variable-length records according to certain embodiments. The method depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by one or more of the sorters 104. In certain embodiments, such as in the embodiment depicted in FIG. 2, the processing depicted in FIG. 3 may be performed by the sorter 206.

At block 302, the processing may be initiated when the data processing system receives a request to sort a set of variable-length records that are stored in runs in memory. Each run contains a sorted subset of the set of variable-length records, which are stored in a list of memory pages (e.g., a set of one or more memory pages). Each memory page may be a contiguous section of temporary memory of a constant size. In some embodiments, each memory page may have a relatively small size (e.g. 256 kb) that is still capable of storing multiple variable-length records. Thus, a run may include multiple memory pages, with each memory page containing multiple variable-length records. The sorted subset of the set of variable-length records stored in a run can be obtained by scanning the contents of each memory page in the list of memory pages of the run, in the appropriate order.

At block 304, the data processing system will sort and merge input runs in pair-wise fashion to create merged runs. Whenever possible, empty memory pages from input runs can be released to a cache of memory pages, while empty pages can be added to a merged run from the cache of memory pages. This allows memory pages from input runs to be reused for the merged runs. At a high level, this is performed by sequentially and incrementally scanning, sorting, and copying the variable-length records (in sorted order), from the memory pages of the two input runs into memory pages of a merged run. Whenever all the variable-length records in a memory page of an input run have been processed and copied into the merged run, that emptied memory page is released to an available cache of memory pages where it can be reused. Whenever the merged run requires new memory pages in order to store records copied over from the input runs, the data processing system will first check to see if any empty memory pages are available in the cache of memory pages. If there are empty memory pages available in the cache of memory pages, an empty memory page from the cache will be retrieved and added to the merged run instead of allocating new memory (e.g., for a new memory page). Thus, when possible, memory pages freed up from the two input runs can be reused in the merged run or for future merged runs.

In some embodiments, for block 304, the data processing system may select two runs as the two input runs for merging based on the number of records or the total size of the records stored in each of those two runs. For instance, the data processing system may attempt to select two runs that contain relatively similar number of records or have the closest number of records to be the two input runs for merging. Alternatively, the data processing system may attempt to select two runs that are of similar size (e.g., the total size of all the records in each run are similar) to be the two input runs for merging. There may be a technical advantage associated with prioritizing the merging of runs having similar number of records (a proxy for determining size) or similar sizes, since merging two runs of similar sizes may be faster and more efficient than merging runs of different sizes.

In some embodiments, for block 304, the data processing system may select two runs as the two input runs for merging based on the total amount of space associated with the list of memory pages including in each of the two runs. For instance, the data processing system may attempt to select two runs that contain the same number of memory pages (since each memory page would be of constant size) to be the two input runs for merging.

At block 306, the data processing system will continue to use the process outlined in block 304 in order to sort and merge existing runs (including any input runs and merged runs) until a single run remains. Thus, the data processing system may constantly be trying to select two runs at a time for merging based on the selected criteria (e.g., merging two runs that have records of similar size). Once a point is reached where there are no runs of similar size, the data processing system may attempt to merge runs that are closest in size until a single run remains. The memory pages of the single run will contain the entire set of variable-length records (e.g., stored initially in the multiple runs) in sorted order. At block 308, the data processing system will output the sorted records.

Figure 4:
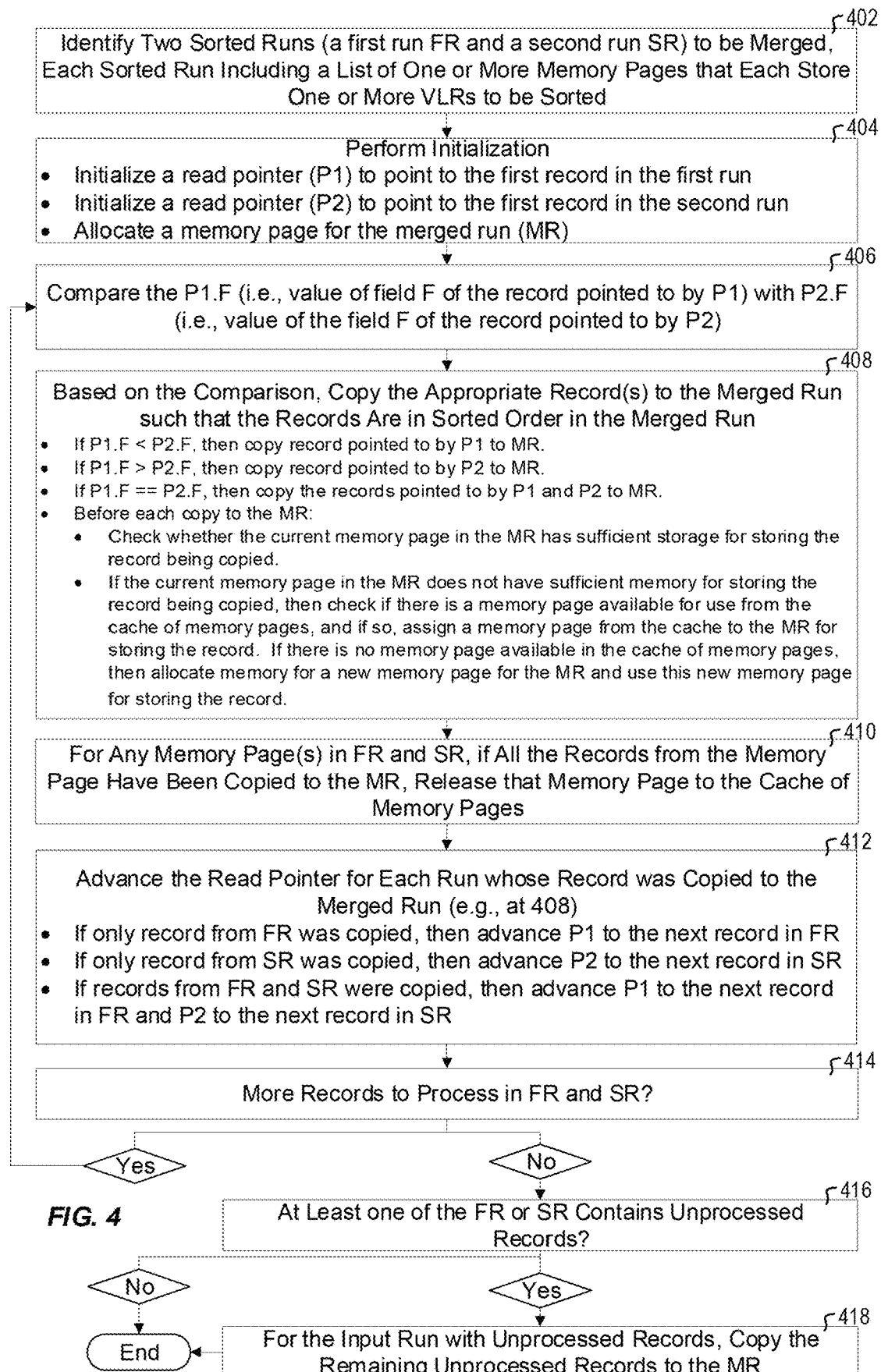
FIG. 4 is a flowchart for performing optimized sorting of variable-length records according to certain embodiments.

FIG. 4 is a flowchart for performing optimized sorting of variable-length records according to certain embodiments. The logic depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The logic presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by one or more of the sorters 104. In certain embodiments, such as in the embodiment depicted in FIG. 2, the processing depicted in FIG. 4 may be performed by the sorter 206. The processing depicted in FIG. 4 will be further explained using the example in FIGS. 5A-5D.

Figure 5A:
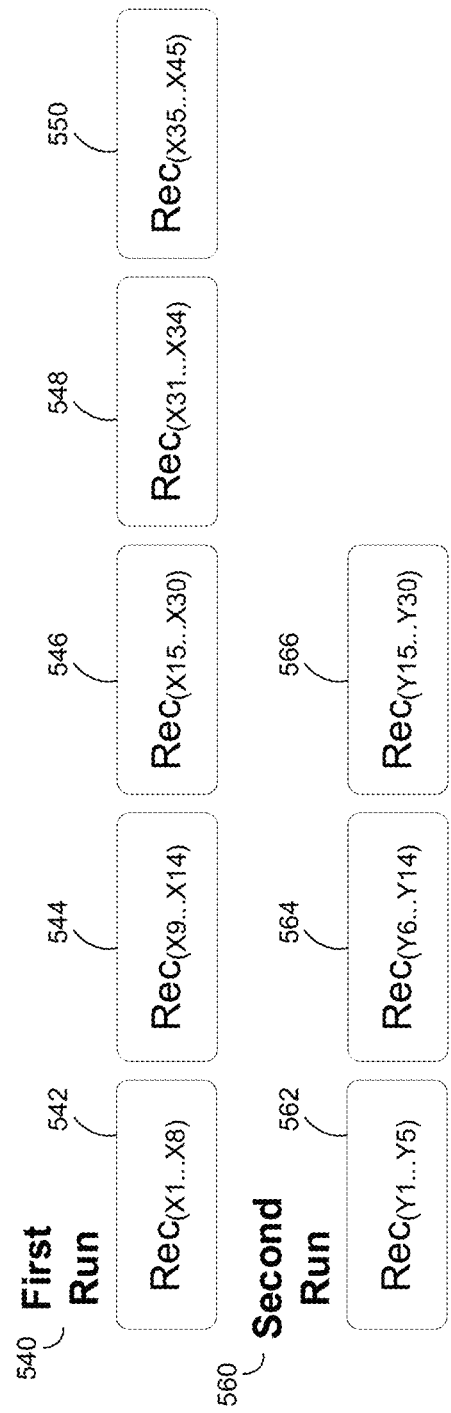
FIGS. 5A-5D illustrate an example of optimized sorting of variable-length records according to certain embodiments.

At block 402, the data processing system may identify two sorted input runs to be merged. These two sorted runs can be referred to as a first run (FR) and a second run (SR). Each of these sorted runs will include a list of one or more memory pages storing records to be sorted, with each memory page storing one or more variable length records. The records from both sorted input runs are to be sorted in ascending order based upon the value of a particular field (F) in the records. The data processing system may select and identify the two sorted input runs based on various criteria. In some embodiments, the data processing system may selected two input runs based on the total size of the records stored in each of those two runs. For instance, the data processing system may attempt to select two input runs that are of similar size (e.g., the total size of all the records in each run are similar) or as close in size as possible, since sorting and merging two runs of similar sizes may be faster and more efficient than sorting and merging runs of different sizes. For example, as shown in FIG. 5A, two runs containing sorted variable-length records may be stored in memory. In this example, the first run 540 has a sorted subset of variable-length records (X1 through X45) which are stored across a list of five memory pages: memory pages 542, 544, 546, 548, and 550. The second run 560 has a sorted subset of variable-length records (Y1 through Y30) which are stored across a list of three memory pages: memory pages 562, 564, and 566. The data processing system may identify the first run 540 and the second run 560 to be the two input runs to be merged (e.g., the first run 540 and the second run 560 are of similar size).

After the two sorted runs have been identified, at block 404, the data processing system may perform initialization. The data processing system may initialize a read pointer (P1) to point to the first record (e.g., in the first memory page) in the first run, as well as a read pointer (P2) to point to the first record (e.g., in the first memory page) in the second run. At the same time, the data processing system may create a merged run and allocate an empty memory page from the cache of memory pages to the merged run.

The initialization of these particular read pointers is associated with the fact that the records in each of the two sorted input runs will be stored in sorted order in the list of memory pages associated with that run. To ensure that the data processing system scans and reads the records from each run in their sorted order, the data processing system should first scan the first variable-length record in the first memory page associated with each of the two sorted input runs. For example, as depicted in FIG. 5A, the list of memory pages for the first run 540 already hold records X1 to X45 in sorted order, and the list of memory pages for the second run 560 already hold records Y1 to Y30 in sorted order. Memory page 542 holds the first record for the first run 540 and memory page 562 holds the first record for the second run 560. Thus, in order to preserve the sorted order when scanning the variable-length records in both runs, the data processing system will initialize a read pointer (P1) to point to the first record (X1) in memory page 542 for the first run 540 and initialize a read pointer (P2) to point to the second record (Y1) in memory page 562 for the second run 560.

At block 406, the data processing system will sort and compare values for the two records pointed to by the read pointers. More specifically, the data processing system will compare P1.F (i.e., the value of field F of the record pointed to by P1) with P2.F (i.e., the value of the field F of the record pointed to by P2). The data processing system will determine which of the two records should be ordered first.

At block 408, the data processing system will then, based on the comparison, copy the appropriate record(s) to the merged run such that the records are in sorted order in the merged run. If P1.F<P2.F, then the data processing system will copy the record pointed to by P1 to the merged run. If P1.F>P2.F, then the data processing system will copy the record pointed to by P2 to the merged run. If P1.F=P2.F, then the data processing system will copy the records pointed to by P1 and P2 to the merged run. For example, as depicted in FIG. 5A, the first two records selected by the data processing system will be X1 and Y1. Sorting between these two records the data processing system may determine that X1 is ordered before Y1, which means that X1 should be copied over to the merged run first.

Figure 5B:
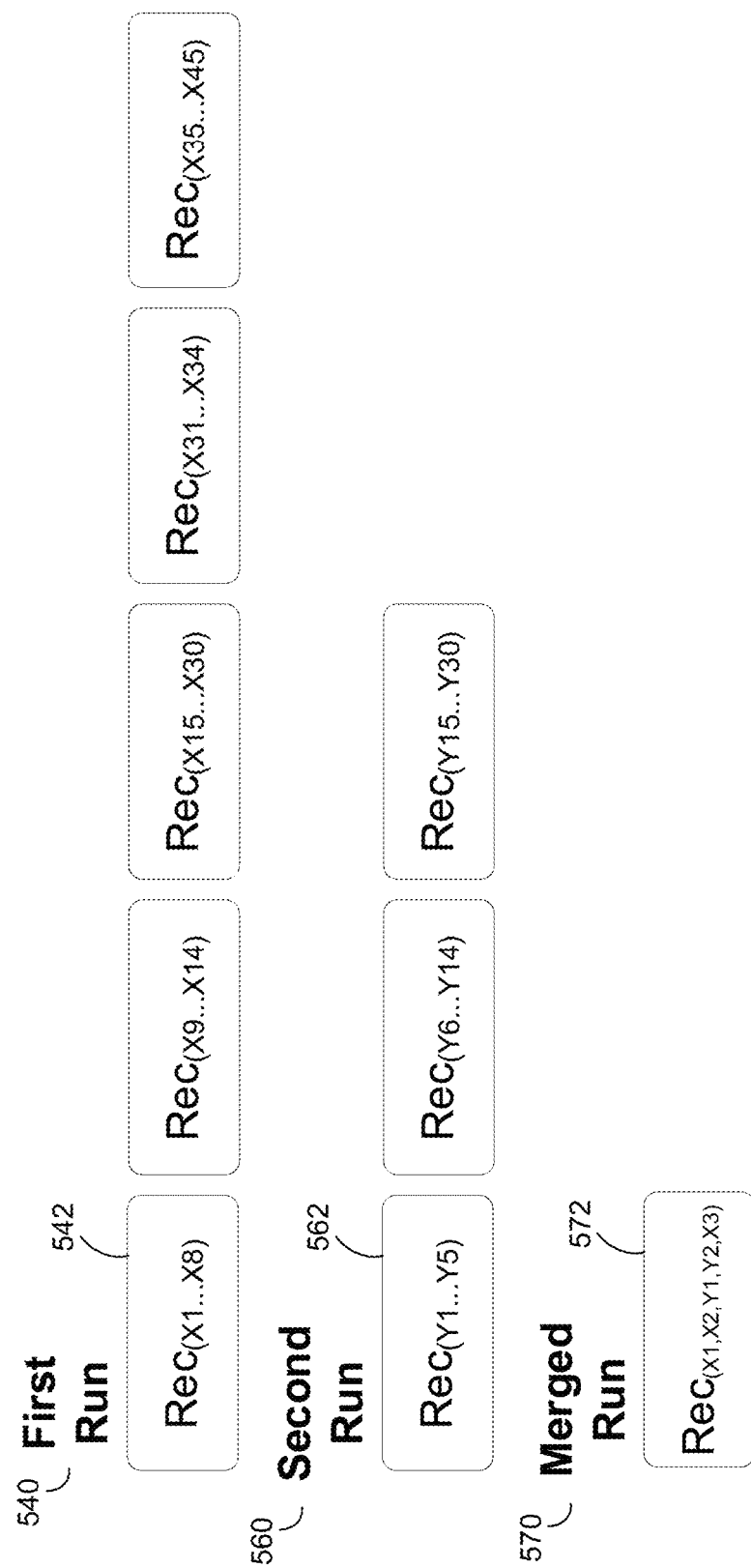

However, before any records are copied to the merged run, the data processing system will check to see whether the current memory page in the merged run has sufficient storage for storing the record being copied. If the current memory page in the merged run does not have sufficient memory for storing the record being copied (e.g., all the memory pages in the merged run have been filled up with records copied over from the input runs), then the data processing system will check if there is an empty memory page available for use from the cache of memory pages. If so, then the data processing system will assign an empty memory page from the cache of memory pages to the merged run for storing the record. Alternatively, if there is no memory page available in the cache of memory pages, then the data processing system will allocate memory for a new memory page for the merged run and use this new memory page for storing the record. For example, as depicted in FIG. 5A, a merged run has not yet been initialized yet so there is no available memory page for record X1 to be copied to. The data processing system will have to create a merged run, such as the merged run 570 shown in FIG. 5B. The data processing system will then allocate an empty memory page from the cache of memory pages to this run, which is shown in FIG. 5B as memory page 572.

Once the merged run has a memory page with free space to copy the records to, then the data processing system will copy over the appropriate record(s) determined at block 408 to the memory page in the merged run. For example, as depicted in FIG. 5B, the data processing system determined between the two selected records, X1 and Y1, that X1 is ordered before Y1. This means that X1 will be copied over to the merged run first. Thus, X1 is first copied over to the memory page 572 of the merged run 570.

As described above, if it is determined in 408 that P1.F is equal to P2.F, then the data processing system will copy the records pointed to by P1 and P2 to the merged run. In certain embodiments, the data processing system may first check the memory available on the memory page in the merged run to which the records are to be copied to, and first copy the record (either one of the records pointed to by P1 and P2) whose size best fits the memory available on the memory page in the merged run. The other record may be copied after the first record has been copied. For example, if the memory page in the merged run has sufficient memory for storing the record pointed to by P1 and not P2, then the record pointed to by P1 may be copied first, and then followed by copying the record pointed to by P2, which may require an additional memory page for the merged run.

At block 410, the data processing system will, for any memory page(s) in the first run and second run, empty and release that memory page to the cache of memory pages (for future reuse) if all the records in that memory page have been copied to the merged run. For example, in FIGS. 5C and 5D, it can be seen that all the records (Y1, Y2, Y3, Y4, and Y5) from the selected memory page 562 of the second run 560 have been copied to the merged run 570. Once all the contents of the memory page 562 have been copied, the memory page can be emptied and released to the cache of memory pages 590. The result can be seen in FIG. 5D, as the second run 560 now only includes two memory pages: memory page 564 and memory page 566.

At block 412, the data processing system will advance the read pointer for each run whose record was copied to the merged run at block 408. If only the record from the first run was copied, then the data processing system will advance P1 to the next record in the first run. If only the record from the second run was copied, then the data processing system will advance P2 to the next record in the second run. If records from both the first run and the second run were copied, then the data processing system will advance P1 to the next record in the first run and P2 to the next record in the second run.

For instance, if there are still more records remaining in the memory page of the input run that the copied record originated from, the read pointer associated with that input run will be advanced to the next record in that memory page. In the example depicted in FIG. 5B, once X1 has been copied to the merged run 570, the data processing system will determine that there are still more records in the selected memory page 542 that X1 was copied from. Thus, the data processing system will advance the read pointer P1 to the next record in memory page 542, which is X2. The read pointer P2 will continue to point to Y1 in memory page 562, since Y1 was not copied into the merged run 570.

At block 414, the data processing system will determine if there are more records to process in the first run and the second run. If there are, then the flowchart will go back to block 406 and go through the flowchart logic again since there are still records in the first run and the second run to be processed. For example, with the read pointer P1 pointing to X2 and read pointer P2 pointing to Y1, the data processing system will sort X2 and Y1 to determine that X2 is ordered before Y1. Once the data processing system determines that there is still space in the memory page 572 of the merged run 570 for additional records to be copied to, then, as depicted in FIG. 5B, X2 will be copied into the memory page 572 to come after X1, which has already been copied into the merged run.

Continuing in this example, so long as the memory page 572 in the merged run 570 has space for additional for records to be copied to and there are more records to process in the first run and the second run, the flowchart will continue to loop through the flowchart in order to incrementally sort and copy records from the first run 540 and the second run 560. In FIG. 5B, this results in the records X1, X2, Y1, Y2, and X3 being copied in that order to the memory page 572 of the merged run 570.

Figure 5C:
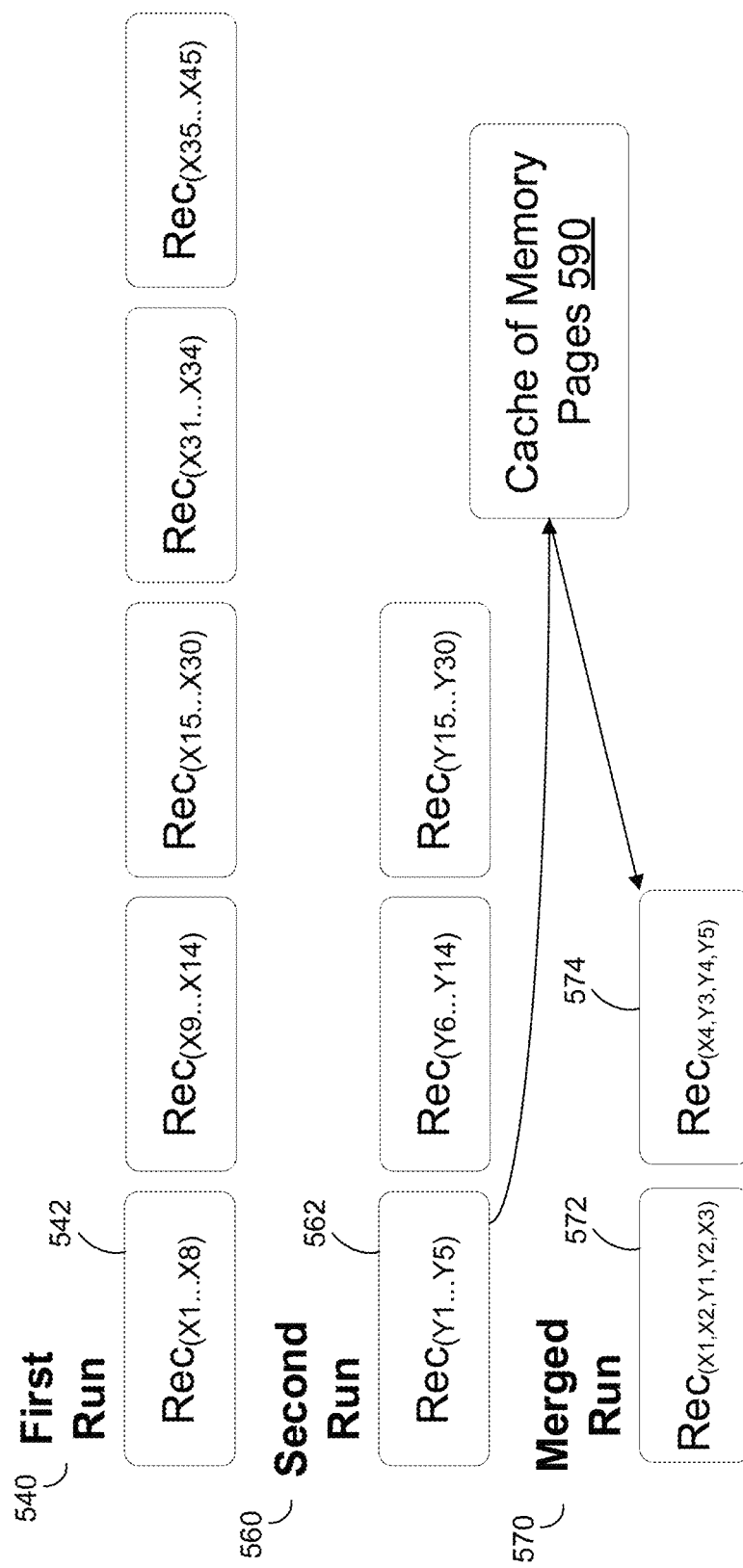
Figure 5D:
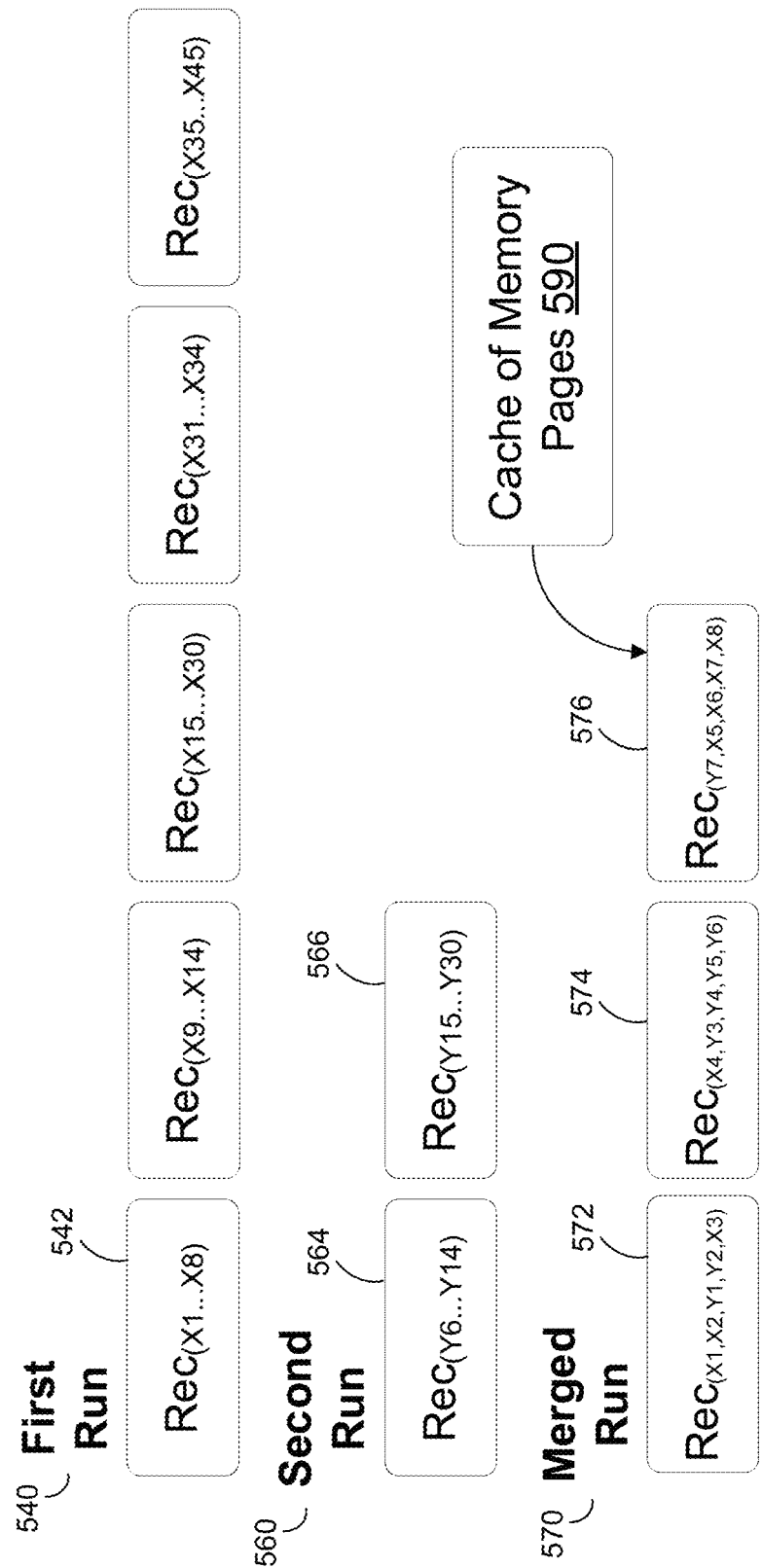

Once a memory page in the merged run is full, an empty memory page from the cache of memory pages can be added to the merged run. For example, in FIG. 5B, if the memory page 572 was full after having records X1, X2, Y1, Y2, and X3, then FIG. 5C depicts a memory page 574 that is added to the merged run 570 from the cache of memory pages 590. Memory page 574 is initially empty when it is added to the merged run 570, but fills up as records from the two input runs are incrementally sorted and copied over. For instance, FIG. 5C shows that after the record X3 is copied to memory page 572 and memory page 572 is full, the records X4, Y3, Y4, and Y5 are copied to memory page 574 in sorted order. Once the records from a memory page of one of the two input runs has been copied to the merged run, that memory page can be released to the cache of memory pages. For instance, as shown in FIG. 5D, the memory page 562 has been released from the second run 560, leaving memory page 564 as the next memory page in the second run 560. Records then continue to be incrementally scanned and sorted from the memory page 542 of the first run 540 and the memory page 564 of the second run 560, filling up memory pages 574 and 576 (which is obtained from the cache of memory pages 590) in the merged run as shown in FIG. 5D.

If however, at block 414, the data processing system determines that there are no more records in the first run or the second run, that means that all the records in one of the two runs (first run or second run) have been processed, or that all the records in both the second run and first run have all been processed. In this case, at block 416 the data processing system will determine if at least one of the first run or the second run contains unprocessed records. If not, that means all the records in both the first run and the second run have been processed, and the merged run contains all the variable-length records from both the first run and the second run in sorted order.

However, if at least one of the first run or the second run contains unprocessed records, then at block 418, for the input run that still has unprocessed records, the data processing system will copy the remaining records from the run to the merged run. As in block 408, the data processing system will check before copying each record to the merged run to see whether the current memory page in the merged run has sufficient storage for storing the record being copied. If the current memory page in the merged run does not have sufficient memory for storing the record being copied, then the data processing system will check if there is a memory page available for use from the cache of memory pages, and if so, assign a memory page from the cache to the merged run for storing the record. Otherwise, if there is no memory page available in the cache of memory pages, then the data processing system will allocate memory for a new memory page for the MR and use this new memory page for storing the record. Additionally, after each record copy, the data processing system will check if any memory page from the input run being copied at block 416 can be released to the cache of memory pages (for potential reuse for the merged run) and release the memory page. At the end of block 418, the merged run will contain all the variable length records from the first run and the second run in sorted order.

At block 420, the data processing system will determine if there are additional memory pages from the input run associated with the copied record. If there are no more additional memory pages containing records, that means all the records in that input run have been copied into the merged run. In this scenario, at block 422, the data processing system will copy the remaining records from the other input run into the merged run while continuing to recycle memory pages (e.g., releasing empty memory pages from the other input run to the cache while adding memory pages to the merged run from the cache, as needed).

Figure 6:
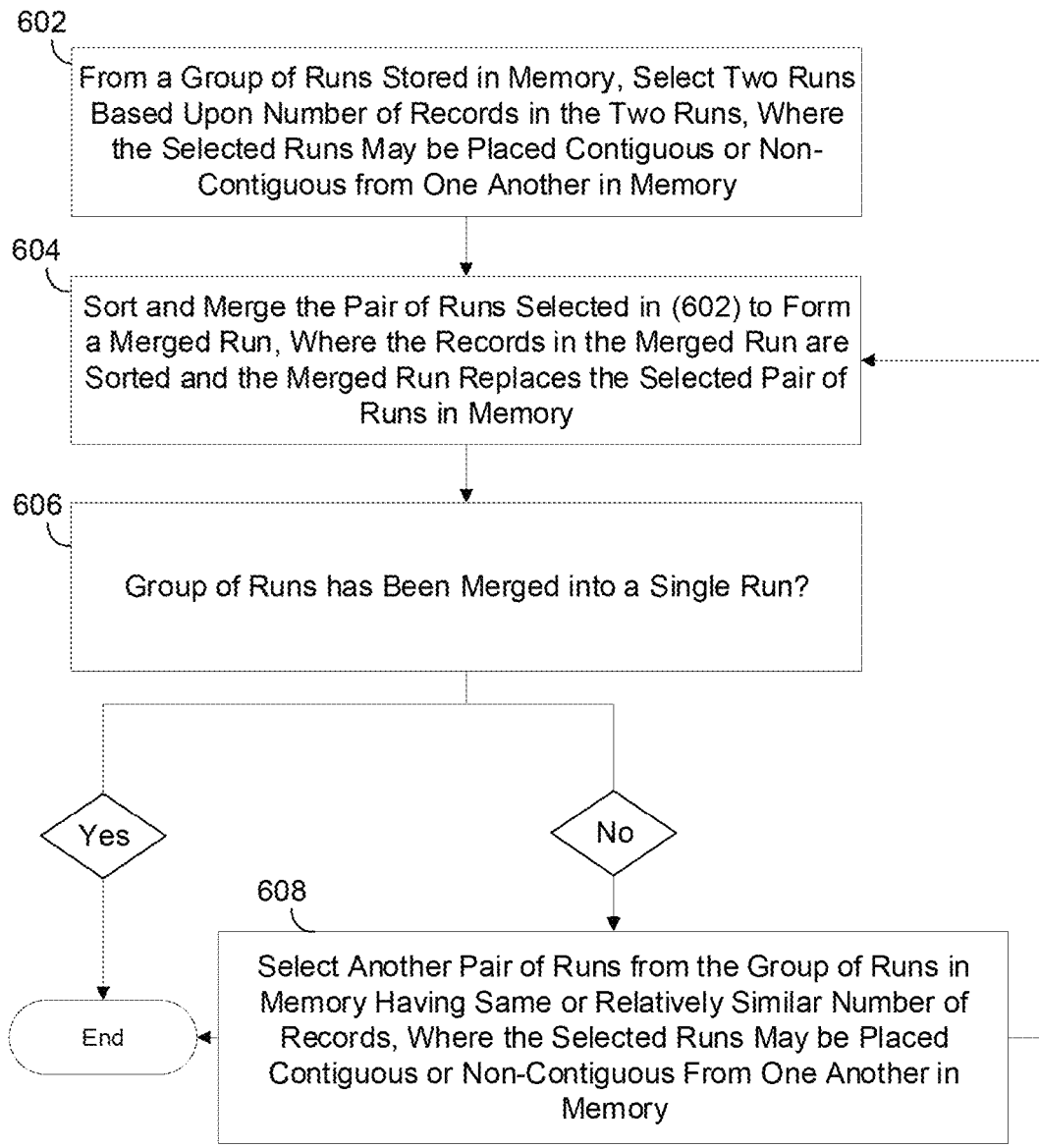
FIG. 6 illustrates a flow chart for merging runs by recycling memory pages according to certain embodiments.

FIG. 6 illustrates a flow chart for sorting and merging runs by reusing memory pages according to certain embodiments. The logic depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The logic presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 6 may be performed by one or more of the sorters 104. In certain embodiments, such as in the embodiment depicted in FIG. 2, the processing depicted in FIG. 6 may be performed by the sorter 206.

In some embodiments, at block 602, the data processing system will select, from a group of runs stored in memory, two runs based upon the number of records in the two runs. More specifically, the two runs that are selected will have the closest number of records to each other. For speed and efficiency purposes, it may be preferable to merge runs of similar size rather than merge runs of different sizes.

These two selected runs will be later merged, irrespective of where each run is located in memory. In other words, the two selected runs may be placed contiguous or non-contiguous from one another in memory. This ability to select runs of similar sizes at non-contiguous locations for merging is enabled by copying the records in those runs to a merged run using memory pages, and this is an advantage over traditional techniques of merging runs, in which only contiguous runs (e.g., located adjacent in memory) can be merged.

At block 604, the data processing system will sort and merge the selected pair of runs selected at block 602 in order to form a merged run. This sort-merge process will take on the form of the process described in regards to FIG. 4. Once all the records in the pair of runs have been copied over to the merged run in sorted order, the merged run has effectively replaced the selected pair of runs in memory.

At block 606, the data processing system will determine if the group of runs have been merged into a single run. If not, then at block 608, the data processing system will select another pair of runs from the group of runs in memory. This selection will also be based on the pair of runs having the same, or relatively similar, number of records. As in block 602, the selected runs may be placed contiguously or non-contiguously from one another in memory. Afterwards, the flowchart loops back to block 604, where the data processing system continues to sort and merge the newly-selected pair of runs to form a merged run.

By reusing memory pages that have been used recently (e.g., by releasing them to and obtaining them from the cache of memory pages), the data processing system is able to take advantage of the CPU cache and perform a native sort operation on variable-length records that completely avoids the use of pointers. This copying of the actual data records maximizes locality of reference because when the resulting merged run is merged again with another run, those data records are traversed in a sequential manner. This takes advantage of CPU caches and data prefetching which provide orders of magnitude performance gains over accessing memory. Furthermore, the amount of temporary memory required for merging two runs is at most 2 memory pages in the worst case, regardless of input run sizes.

Figure 7A:
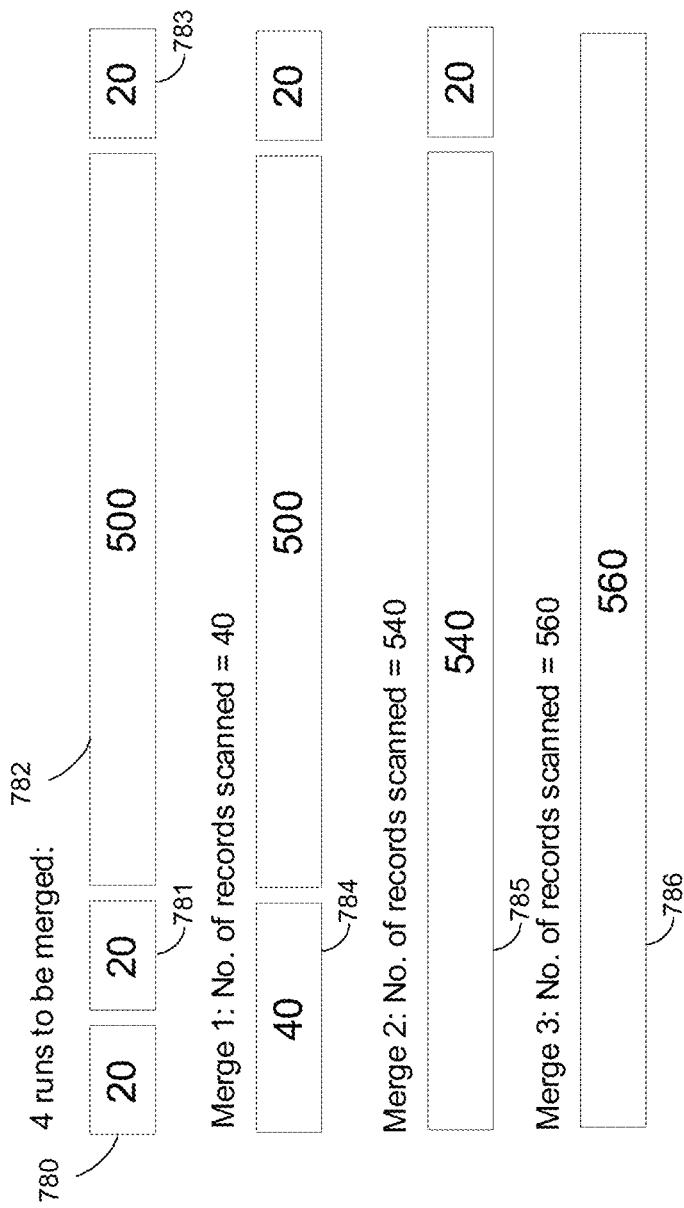
FIG. 7A illustrates an example of a conventional technique for merging runs according to certain embodiments.

FIG. 7A illustrates an example of a conventional technique for merging runs according to certain embodiments.

In a traditional sort operation, memory pages are not used and runs for merging are typically selected without regard to run size. If all runs are stored in contiguous memory, it is difficult to merge non-adjacent runs because the result of the merge does not fit into the contiguous memory without shifting other runs to make room. This limits the merges to only adjacent runs in memory.

For instance, FIG. 7A shows a set of runs stored in one contiguous block of memory, which limits the merging to only adjacent runs for a traditional sort operation. There are four runs to be merged: run 780 containing 20 records, run 781 containing 20 records, run 782 containing 500 records, and run 783 containing 20 records. Run 780, run 781, run 782, and run 783 are stored in one contiguous block of memory.

Due to computing efficiency reasons, it may be desirable to merge runs of similar sizes. However, this is not always a possibility using a traditional sort operation because only adjacent runs can be merged. Initially, run 780 and run 781 are both adjacent and of similar size. Thus, a merge-sort will be performed between run 780 and run 781 and result in run 784 containing 40 records. A total of 40 records will have been scanned during this merge step. This leaves run 784, run 782, and run 783. Although run 784 and run 782 have a large difference in size, run 782 and run 783 have an even larger difference in size. Thus, run 784 and run 782 are both adjacent and have the most-similar size. A merge-sort will be performed between run 784 and run 782 and result in run 785 containing 540 records. A total of 540 records will have been scanned during this merge step. This leaves run 785 and run 783, which are then merged together in a final merge step to produce run 786 containing 560 records. 560 records will be scanned at this merge step. The total number of records scanned across all of these merge steps is 1140.

Figure 7B:
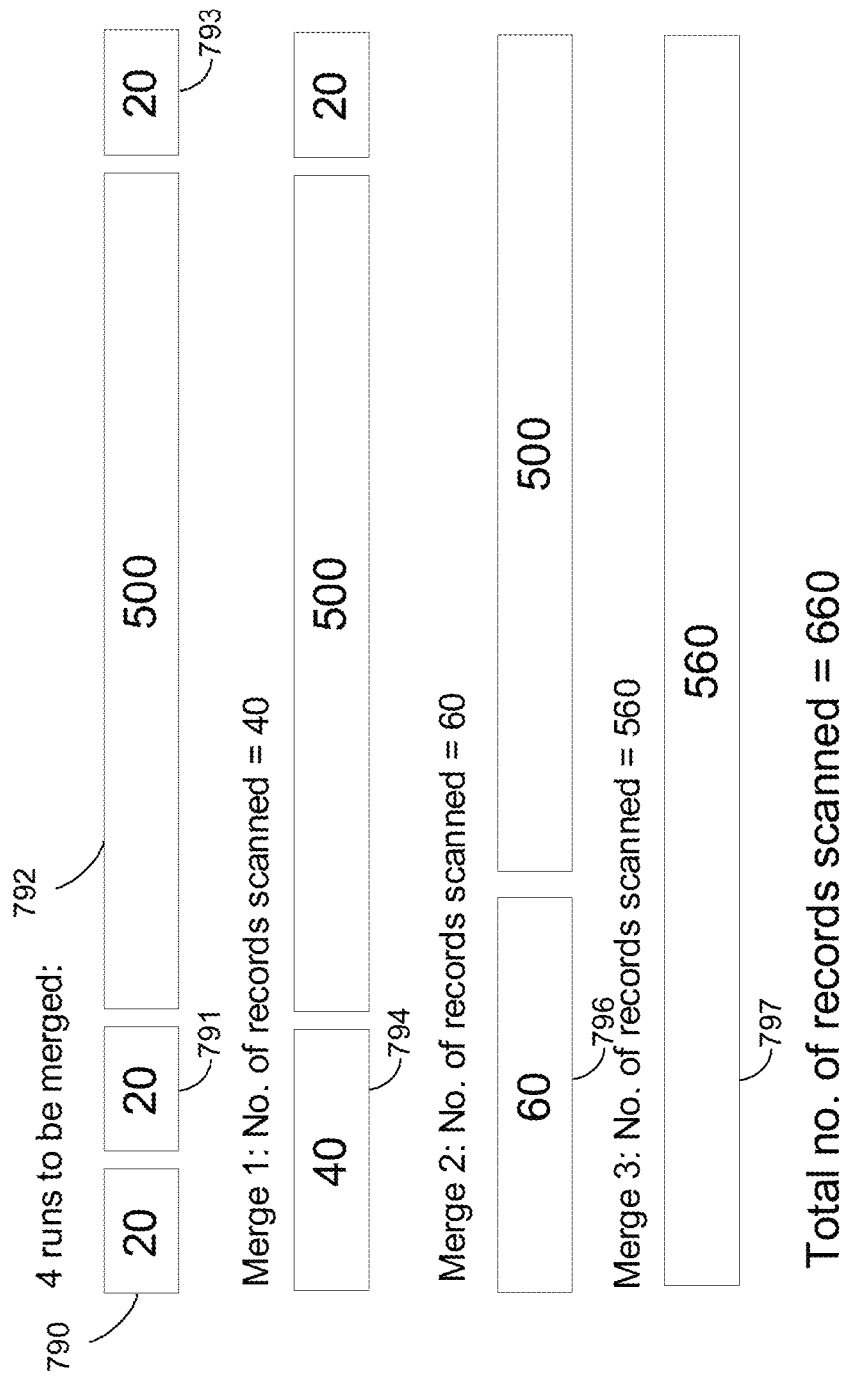
FIG. 7B illustrates an example of a technique for merging runs by recycling memory pages according to certain embodiments.

FIG. 7B illustrates an example of a technique for merging runs by recycling memory pages according to certain embodiments. Storing each run as a list of memory pages allows runs to be merged strictly based on size and without regard for memory location (e.g., runs do not have to be adjacent in memory). In other words, runs of roughly-equal size can be merged for computing efficiency, without regard for where those runs are located in the memory, reducing the amount of data scanned during all the merges.

For example, FIG. 7B shows four runs to be merged: run 790 containing 20 records, run 791 containing 20 records, run 792 containing 500 records, and run 793 containing 20 records. Run 790 and run 791 are of roughly similar size and can be merged first (alternatively, one of those runs could be merged with run 793—the use of memory pages permits it). A merge-sort will be performed between run 790 and run 791 and result in run 794 containing 40 records. A total of 40 records will have been scanned during this merge step. This leaves run 794, run 792, and run 793. Run 794 (containing 40 records) and run 793 (containing 20 records) are the closest in size since run 792 contains 500 records. The use of memory pages permits run 794 to be merged with run 793, which will result in run 796 containing 60 records. A total of 60 records will have been scanned during this merge step. This leaves run 796 and run 792, which can be merged in a final step to produce run 797 containing 560 records. 560 records will be scanned at this merge step. The total number of records scanned across all of these merge steps is 660, which is significantly less than the 1140 records scanned in the previous example shown in FIG. 7A, which was limited to merging adjacent runs.

The teachings described herein can be used in various different settings and contexts. In one such example, the teachings may be used by an analytics server that is configured to receive a large amount of data records and has to perform various types of analyses on the records, where the analyses involve sorting off the data records. For example, Oracle Corporation® provides an Analytics Server that acts as a query and analysis engine for multiple Oracle Business Intelligence (BI) offerings, such as including Oracle Data Visualization Desktop. Oracle Data Visualization Desktop's user interface is a tool called Visual Analyzer, which allows business users to visualize and explore their data using rich visualizations. The Visual Analyzer analyses data and provides business users with various visualizations (e.g., graphs, pie charts, etc.) that allow business users to better interpret and comprehend the mountains of data that has been collected in order to draw inferences and arrive at conclusions. Once the Visual Analyzer is provided user inputs laying out the parameters of the analysis to be performed, the Visual Analyzer generates and issues SQL statements to Oracle BI Analytics Server. The Server processes these SQL statements and returns the relevant data, which is then presented by Visual Analyzer to the business users using various forms of visualization, e.g. pie charts, line graphs, etc. The execution of the SQL statements by the Server can generate a large amount of the data records that have to be sorted before the server can return the relevant data to the Visual Analyzer, depending on the needs of the business user. For example, a sort operation may need to be performed on variable-length data records within the database in order to arrange all the data records based on a certain characteristic. The teachings described in the disclosure may be used by the Server to perform these sorts in an efficient manner.

Figure 8:
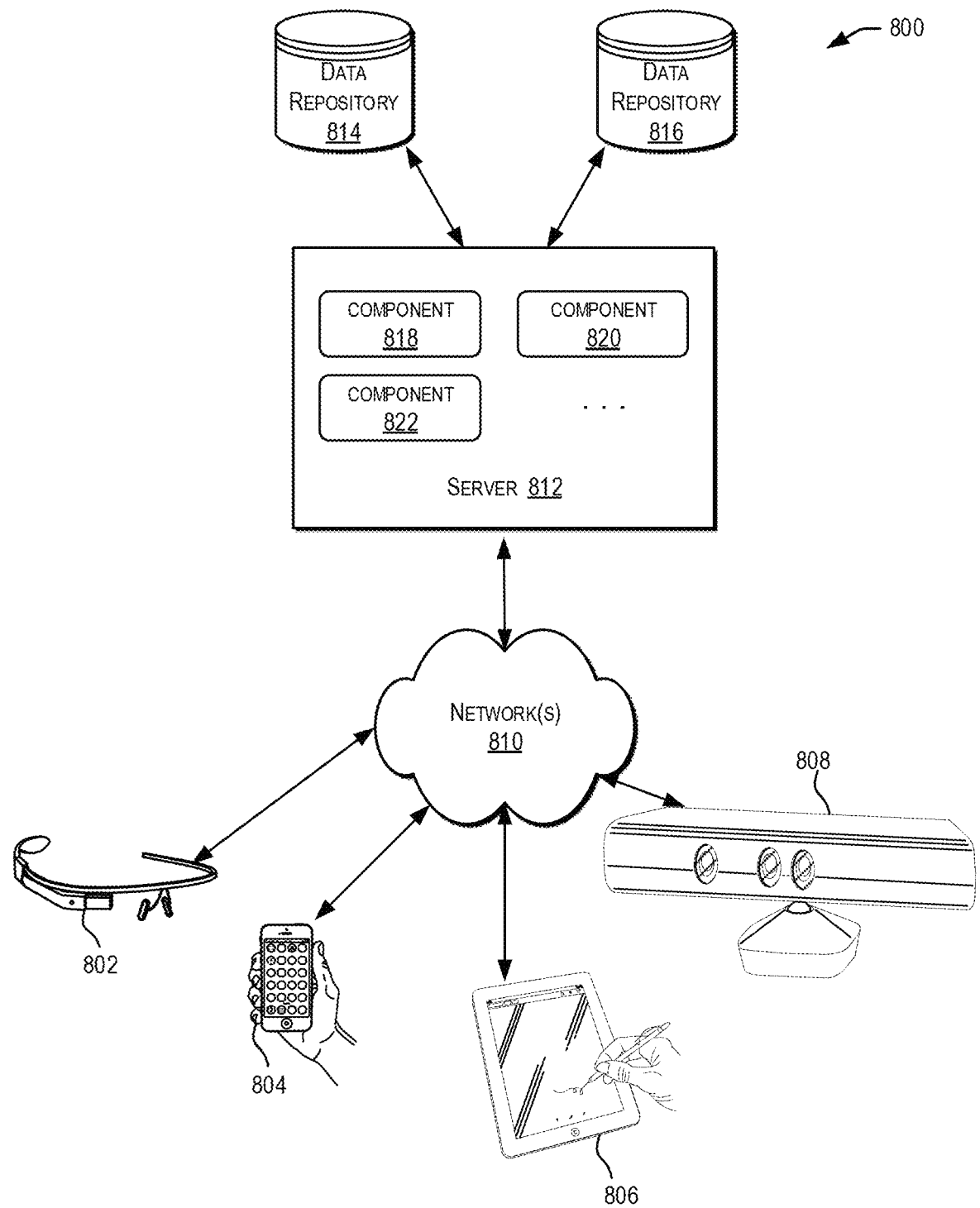
FIG. 8 depicts a simplified diagram of a distributed system for implementing certain embodiments.

FIG. 8 depicts a simplified diagram of a distributed system 800 for implementing an embodiment. In the illustrated embodiment, distributed system 800 includes one or more client computing devices 802, 804, 806, and 808, coupled to a server 812 via one or more communication networks 810. Clients computing devices 802, 804, 806, and 808 may be configured to execute one or more applications.

In various embodiments, server 812 may be adapted to run one or more services or software applications that enable the memory management techniques described herein.

In certain embodiments, server 812 may also provide other services or software applications that can include non-virtual and virtual environments. In some embodiments, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose server computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization such as one or more flexible pools of logical storage devices that can be virtualized to maintain virtual storage devices for the server. In various embodiments, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain embodiments.

Data repositories 814, 816 may be of different types. In certain embodiments, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 814, 816 may also be used by applications to store application data. The data repositories used by applications may be of different types such as, for example, a key-value store repository, an object store repository, or a general storage repository supported by a file system.

Figure 9:
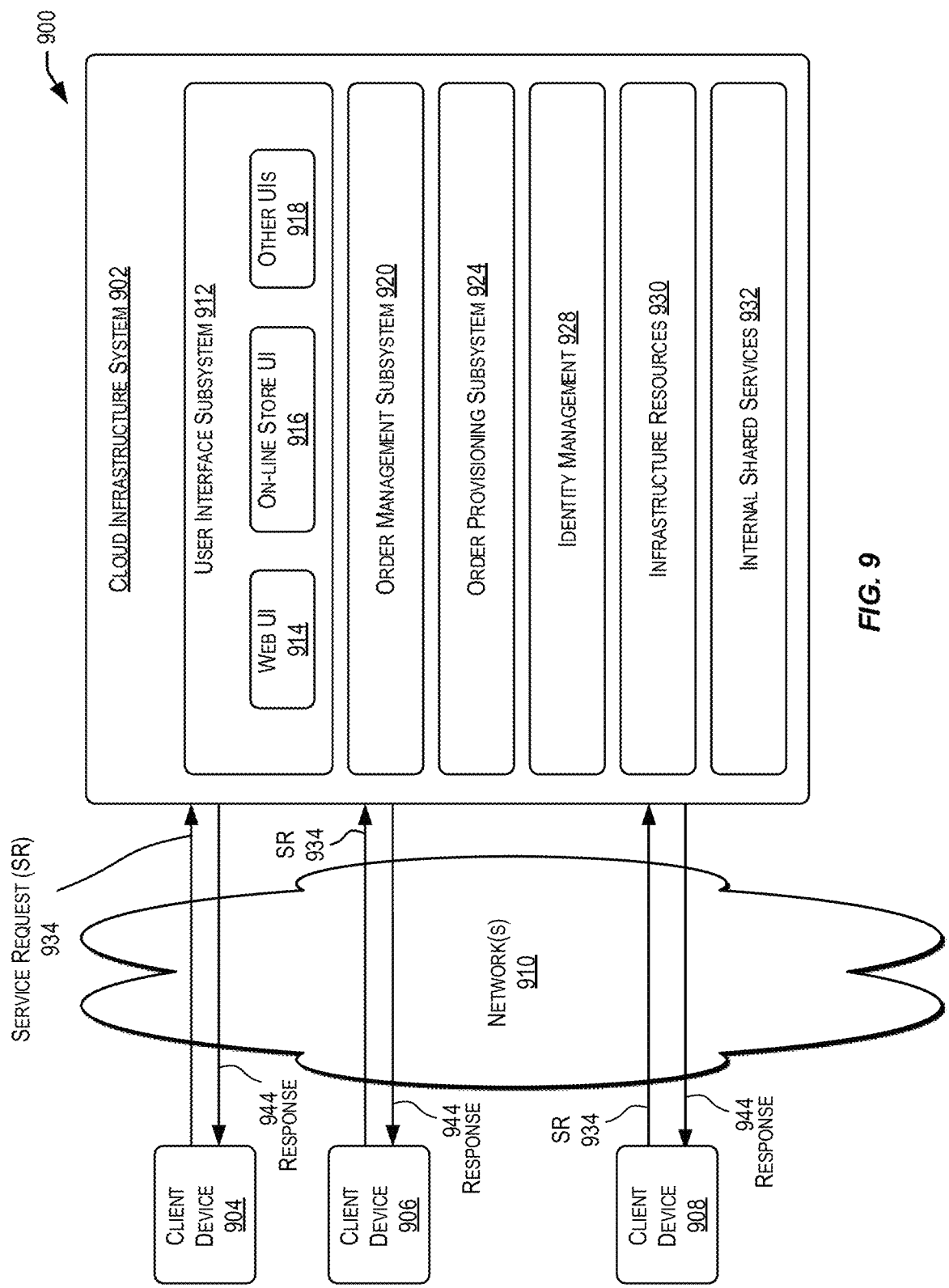
FIG. 9 is a simplified block diagram of a cloud-based system environment in which various services may be offered as cloud services, in accordance with certain embodiments.

In certain embodiments, the memory management-related functionalities described in this disclosure may be offered as services via a cloud environment. FIG. 9 is a simplified block diagram of a cloud-based system environment in which sorting-related services may be offered as cloud services, in accordance with certain embodiments. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer can be an individual or an enterprise. In certain other embodiments, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902.

In some embodiments, the processing performed by cloud infrastructure system 902 for providing services may involve big data analysis. This analysis may involve using, analyzing, and manipulating and sorting large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain embodiments, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to.

In certain embodiments, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
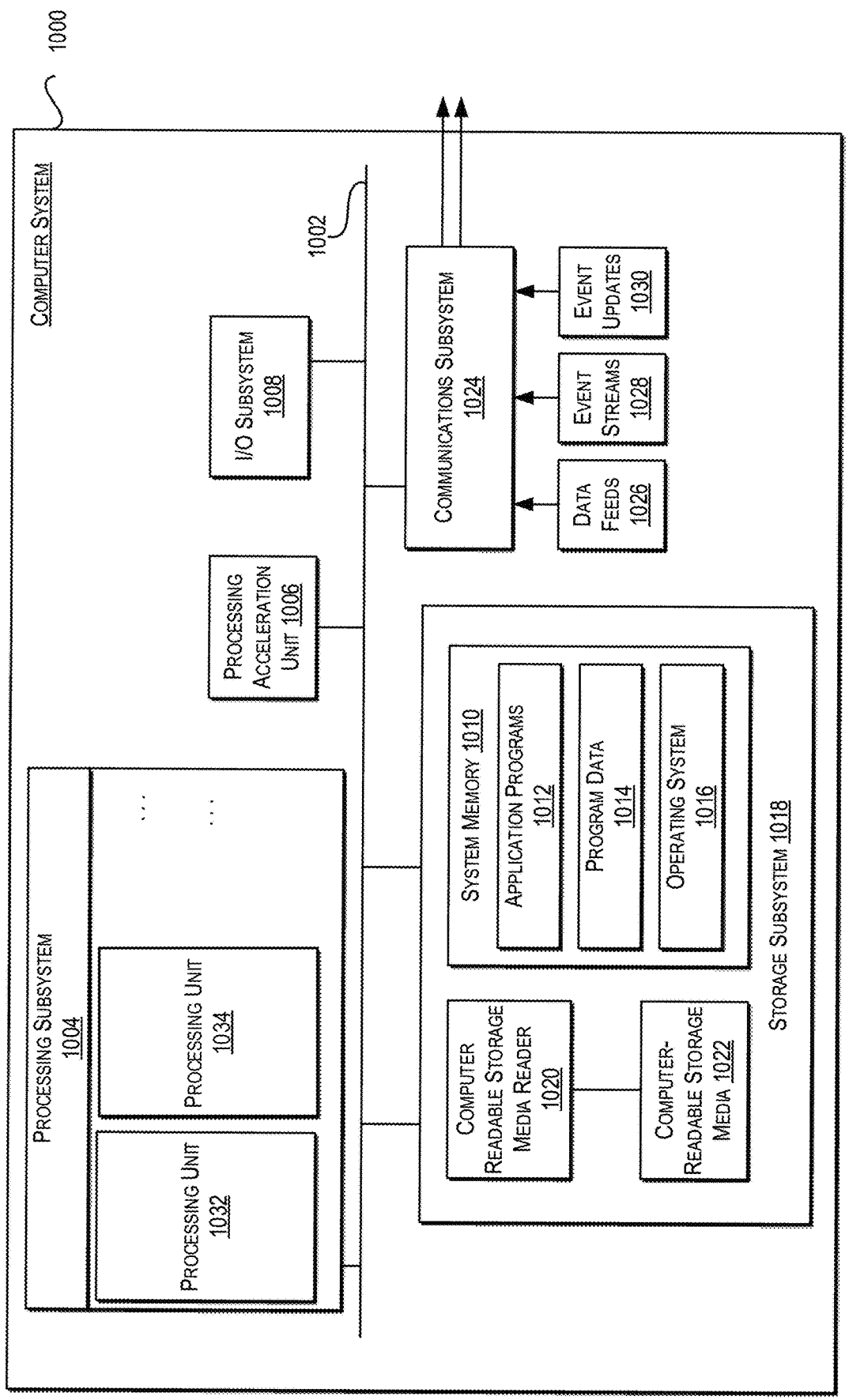
FIG. 10 illustrates an exemplary computer system that maybe used to implement certain embodiments.

FIG. 10 illustrates an exemplary computer system 1000 that may be used to implement certain embodiments. For example, in some embodiments, computer system 1000 may be used to implement data processing system 100 depicted in FIG. 1. Data processing system 100 may comprise one or more computer systems 1000. Computer system 1000 may also be used to perform the various processing described in this disclosure. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 900 and may comprise one or more processors, application specific integrated circuits (ASICs), or field programmable gate arrays (FPGAs). The processors may include be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for performing optimized sorting of variable-length records, wherein the method comprising:
   accessing, from a memory, a first run comprising a first set of sorted variable length records, the first run comprising one or more memory pages storing the first set of sorted variable length records;
   accessing, from the memory, a second run comprising a second set of sorted variable length records, the second run comprising one or more memory pages storing the second set of sorted variable length records; and
   generating, in the memory, a merged run by copying records from the first run and the second run to the merged run, wherein the merged run comprises at least a subset of a plurality of records from the first set of variable length records and at least a subset of a plurality of records from the second set of variable length records in a sorted order;
   wherein the generating comprises:
   determining that all records stored in a first memory page of the one or more memory pages in the first run have been copied to the merged run;
   responsive to the determining, releasing the first memory page from the first run to a cache of memory pages; and
   using the first memory page for storing one or more records copied to the merged run from the first or second run.

2. The method of claim 1, wherein the using the first memory page comprises:
   determining that the merged run needs additional memory for storing a particular record being copied from the first or second run;
   determining whether the cache of memory pages comprises any memory page;
   upon determining that the cache of memory pages comprises the first memory page, using the first memory page for the merged run; and
   copying the particular record from the first or second run to the first memory page.

3. The method of claim 1, wherein the generating further comprises:
   determining that all records on a second memory page in the second run have been copied to the merged run;
   releasing the second memory page from the second run to the cache of memory pages; and
   using the second memory page for storing one or more additional records copied to the merged run from the first or second run.

4. The method of claim 1, wherein the generating further comprises:
reading a first record stored on the first memory page in the first run;
reading a second record from the second run;
comparing the first record to the second record;
based upon the comparing, copying the first record from the first run to the merged run;
wherein the determining that all records on the first memory page in the first run have been copied to the merged run is performed after the copying the first record from the first run to the merged run.

5. The method claim 1, further comprising:
storing a plurality of runs in the memory, the plurality of runs including the first run and the second run;
determining that, from among the plurality of runs, the first run and the second run have a closest number of records to each other; and
responsive to the determining that the first run and the second run have the closest number of records to each other, selecting the first run and the second run to be merged.

6. The method of claim 5, wherein:
the first run is stored in a first section of the memory;
the second run is stored in a second section of the memory; and
the first section is not contiguous with the second section in the memory.

7. The method of claim 1, wherein:
the first set of variable length records comprises a first record of a first size and a second record of a second size; and
the first size is different from the second size.

8. The method of claim 1, wherein:
the first run includes a second memory page; and
a number of variable length records stored in the first memory page in the first run is different from a number of records stored in the second memory page in the first run.

9. A non-transitory computer-readable medium containing instructions for optimized sorting of variable-length records wherein the instructions, when executed by a processor, cause the processor to:
access, from a memory, a first run comprising a first set of sorted variable length records, the first run comprising one or more memory pages storing the first set of sorted variable length records;
access, from the memory, a second run comprising a second set of sorted variable length records, the second run comprising one or more memory pages storing the second set of sorted variable length records; and
generate, in the memory, a merged run by copying records from the first run and the second run to the merged run, wherein the merged run comprises at least a subset of a plurality of records from the first set of variable length records and at least a subset of a plurality of records from the second set of variable length records in a sorted order;
wherein the generating comprises:
determining that all records stored in a first memory page of the one or more memory pages in the first run have been copied to the merged run;
responsive to the determining, releasing the first memory page from the first run to a cache of memory pages; and
using the first memory page for storing one or more records copied to the merged run from the first or second run.

10. The non-transitory computer-readable medium of claim 9, wherein the using the first memory page comprises:
determining that the merged run needs additional memory for storing a particular record being copied from the first or second run;
determining whether the cache of memory pages comprises any memory page;
upon determining that the cache of memory pages comprises the first memory page, using the first memory page for the merged run; and
copying the particular record from the first or second run to the first memory page.

11. The non-transitory computer-readable medium of claim 9, wherein the generating further comprises:
determining that all records on a second memory page in the second run have been copied to the merged run;
releasing the second memory page from the second run to the cache of memory pages; and
using the second memory page for storing one or more additional records copied to the merged run from the first or second run.

12. The non-transitory computer-readable medium of claim 9, wherein the generating further comprises:
reading a first record stored on the first memory page in the first run;
reading a second record from the second run;
comparing the first record to the second record;
based upon the comparing, copying the first record from the first run to the merged run;
wherein the determining that all records on the first memory page in the first run have been copied to the merged run is performed after the copying the first record from the first run to the merged run.

13. The non-transitory computer-readable medium of claim 9, wherein the instructions, when executed by the processor, further cause the processor to:
store a plurality of runs in the memory, the plurality of runs including the first run and the second run;
determine that, from among the plurality of runs, the first run and the second run have a closest number of records to each other; and
responsive to the determining that the first run and the second run have the closest number of records to each other, selecting the first run and the second run to be merged.

14. The non-transitory computer-readable medium of claim 13, wherein:
the first run is stored in a first section of the memory;
the second run is stored in a second section of the memory; and
the first section is not contiguous with the second section in the memory.

15. The non-transitory computer-readable medium of claim 9, wherein:
the first set of variable length records comprises a first record of a first size and a second record of a second size; and
the first size is different from the second size.

16. The non-transitory computer-readable medium of claim 9, wherein:
the first run includes a second memory page; and
a number of variable length records stored in the first memory page in the first run is different from a number of records stored in the second memory page in the first run.

17. A data processing system for performing optimized sorting of variable-length records, the system comprising:
one or more processors and a memory coupled to the one or more processors;
a sorter, executed by the one or more processors, configured to:
access, from the memory, a first run comprising a first set of sorted variable length records, the first run comprising one or more memory pages storing the first set of sorted variable length records;
access, from the memory, a second run comprising a second set of sorted variable length records, the second run comprising one or more memory pages storing the second set of sorted variable length records; and
generate, in the memory, a merged run by copying records from the first run and the second run to the merged run, wherein the merged run comprises at least a subset of a plurality of records from the first set of variable length records and at least a subset of a plurality of records from the second set of variable length records in a sorted order;
wherein the generating comprises:
determining that all records stored in a first memory page of the one or more memory pages in the first run have been copied to the merged run;
responsive to the determining, releasing the first memory page from the first run to a cache of memory pages; and
using the first memory page for storing one or more records copied to the merged run from the first or second run.

18. The system of claim 17, wherein the using the first memory page comprises:
determining that the merged run needs additional memory for storing a particular record being copied from the first or second run;
determining whether the cache of memory pages comprises any memory page;
upon determining that the cache of memory pages comprises the first memory page, using the first memory page for the merged run; and
copying the particular record from the first or second run to the first memory page.

19. The system of claim 17, wherein the generating further comprises:
determining that all records on a second memory page in the second run have been copied to the merged run;
releasing the second memory page from the second run to the cache of memory pages; and
using the second memory page for storing one or more additional records copied to the merged run from the first or second run.

20. The system of claim 17, wherein the generating further comprises:
reading a first record stored on the first memory page in the first run;
reading a second record from the second run;
comparing the first record to the second record;
based upon the comparing, copying the first record from the first run to the merged run;
wherein the determining that all records on the first memory page in the first run have been copied to the merged run is performed after the copying the first record from the first run to the merged run.

* * * * *

UNITED STATES PATENT AND TRADEMARK OFFICE
CERTIFICATE OF CORRECTION

PATENT NO. : 10,824,558 B2
APPLICATION NO. : 15/960385
DATED : November 3, 2020
INVENTOR(S) : Mittal et al.

Page 1 of 1

It is certified that error appears in the above-identified patent and that said Letters Patent is hereby corrected as shown below:

On the Title Page

On page 2, Column 2, under Other Publications, Line 2, delete "archivepouvertes.fr," and insert -- archives-ouvertes.fr, --, therefor.

In the Specification

In Column 3, Line 39, delete "records" and insert -- record --, therefor.

In the Claims

In Column 29, Line 13, in Claim 5, after "method" insert -- of --.

Signed and Sealed this
Eighth Day of June, 2021

Drew Hirshfeld
*Performing the Functions and Duties of the
Under Secretary of Commerce for Intellectual Property and
Director of the United States Patent and Trademark Office*